Patented Mar. 30, 1943

2,315,203

UNITED STATES PATENT OFFICE 2,315,203

CELLULOSE ESTER MANUFACTURE

Rudolf Hofmann and Wilhelm Simson, Dormagen, Germany; vested in the Alien Property Custodian No Drawing. Application March 7, 1939, Serial No. 260,333. In Germany March 10, 1938

4 Claims. (Cl. 260—227)

The present invention relates to processes for producing organic esters of cellulose, especially cellulose acetate.

In such processes, it is customary to treat cellulosic material, for instance cellulose from wood or cotton linters, with a suitable liquid esterifying medium. The esterifying reaction is exothermic. The heat generated thereby causes the temperature of the reaction mixture to rise. On the other hand, higher temperatures during acetylation are detrimental to the quality of the resulting products because the molecule of the cellulose or of the cellulose ester formed therefrom is degraded thereby, so that very often the resulting products are of too low viscosity as to be useful for practical purposes. Good cooling of the reaction mixture, therefore, is an essential necessity in cellulose ester manufacture.

Cooling, however, is the more difficult the larger charges are to be esterified at the same time. Whereas when esterifying small batches of cellulosic material it is sufficient to cool the reaction vessels from without in order to obtain practically useful products, it has been proposed, when esterifying larger charges, to add low boiling diluents to the reaction mixture, which by their evaporation will consume a certain amount of heat and thereby tend to regulate the temperature.

In this manner, for instance according to the process described in the U. S. specification No. 2,126,190, it is possible to produce cellulose acetate of highest quality by acetylating cellulose in batches of, for example, 1,000 kgs. each.

When trying to esterify still larger charges, the difficulty is encountered that even when using low boiling diluents for temperature regulation, the temperature can not be kept so constantly and uniformly below the limit at which it begins to be dangerous to the quality of the resulting products, because the relative proportion of volume and cooling surface of the reaction apparatus reaches such values at which cooling from without is no longer sufficiently effective. In such large apparatus, in which batches of 3,000 kgs. cellulose or more are to be esterified, local increase of the temperature occurs very easily, especially at the beginning of the reaction, which leads to inhomogeneous esterification. Such portions of the cellulosic material which are subject to higher temperatures, on the one hand are more quickly esterified, but on the other hand are also more quickly degraded than such portions which are nearer to the outer cooling surfaces. The esterification, therefore, proceeds very inhomogeneously and it is hardly possible in this way to obtian uniform products of high viscosity.

It is an object of our invention to avoid these difficulties and to furnish a method of esterifying cellulosic material which allows carrying out the reaction in the largest possible charges. This object we attain mainly by spraying the esterifying agent or at least part thereof on the cellulosic material during the reaction, instead of adding it in bulk in one or several portions. In order to facilitate the uniform progress of the reaction, the cellulose material is kept in motion during the reaction, for instance, by means of a stirrer. For spraying the esterifying agent on the material, it is preferred to use spraying nozzles which are mounted in the upper part of the reaction vessel in such manner that the esterifying agent is sprayed as uniformly as possible over the entire surface of the material.

When thus spraying the esterifying agent on the material esterification proceeds very uniformly so that homogeneous cellulose esters of high viscosity can be obtained. It is a further advantage of our new process that the reaction can be controlled by merely varying the rate of spraying. In this manner, the reaction rate can be regulated, for instance, by means of the pressure under which the liquid is sprayed into the reaction room; for example, the rate of spraying is low at the beginning of the reaction and is increased during the course thereof. Thus it is possible to regulate the temperature in all phases of the esterifying reaction in a manner which will give optimum results with regard to the production of high viscosity solutions.

The process of our invention will be illustrated in the following by examples relating to the acetylation of cotton linters by means of acetic acid anhydride and sulfuric acid as a catalyst in the presence of a diluent. We want it to be understood, however, that our new method may be applied also to any other process of producing organic esters of cellulose which is working in the absence of diluents, or in the presence of non-solvents, or with other catalysts like, for instance, perchloric acid, hydrochloric acid, zinc chloride etc., or which starts from different cellulosic material like, for instance, cellulose from wood. Other organic esters of cellulose like cellulose propionate, cellulose butyrate, higher fatty acid esters of cellulose or mixed ester derivatives of cellulose may be manufactured in a similar manner.

Example 1

3000 kgs. of cotton linters having been pretreated in known manner with glacial acetic acid are introduced into a tank containing about ⅓ of the acetic acid anhydride necessary for acetylating, while stirring. Thereupon the rest of the acetylating mixture consisting of acetic acid anhydride, methylene chloride and the catalyst are sprayed on the material by means of 6 spraying nozzles arranged in 2 rows in the upper part of the tank during several hours. The material is well stirred and cooled all the time. The rate of spraying is so regulated that the temperature rises slowly during the course of the reaction, but does not substantially exceed 50° C. In this manner a highly viscous clear solution of cellulose triacetate is obtained which may be worked up in any desired way. Instead of adding the cellulose material to part of the acetic acid anhydride, this amount of acetic acid anhydride may also be sprayed into the tank during introducing of the linters.

Example 2

Cotton linters having been pretreated in the usual manner with glacial acetic acid are introduced into a reaction vessel provided with a stirrer which contains 40 to 45% of the acetic acid anhydride necessary for the reaction, while stirring. Simultaneously, another 40% of acetic acid anhydride are sprayed into the vessel. Thereupon, 40 to 50% of a diluent, for instance, methylene chloride, are added to the mixture.

While always well stirring and cooling, the rest of the acetic acid anhydride and of the methylene chloride and also the catalyst (sulfuric acid) are sprayed on the material. The sulfuric acid may be added to the esterifying mixture before its entering the spraying nozzles by special mixing nozzles.

By varying the rate of spraying and the amount of catalyst added to the esterifying mixture, the course of the reaction can be so regulated that clear homogeneous cellulose ester solutions of optimum viscosity are obtained.

We claim:

1. In the process of producing organic esters of cellulose by treating cellulosic material in batches of more than 1000 kgs. each with a fatty acid anhydride as an esterifying medium containing a member selected from the class consisting of zinc chloride, sulfuric acid, hydrochloric acid, and perchloric acid as catalyst, the modification which comprises spraying at least part of the esterifying agent on the material during esterification, and regulating the rate of spraying in such manner that it is low at the beginning of the reaction, but increases during the course of the reaction, care being taken that the temperature of the reaction mixture does not rise substantially above 50° C.

2. In the process of acetylating cellulosic material in batches of more than 1000 kgs. each by means of a liquid acetylating medium containing a catalyst selected from the group consisting of zinc chloride, sulfuric acid, hydrochloric acid and perchloric acid, the modification which comprises spraying at least part of the acetylating agent on the material during acetylation, and regulating the rate of spraying in such manner that it is low at the beginning of the reaction, but increases during the course of the reaction, care being taken that the temperature of the reaction mixture does not rise substantially above 50° C.

3. In the process of acetylating cellulosic material in batches of more than 1000 kgs. each by means of a liquid acetylating mixture containing a catalyst selected from the group consisting of zinc chloride, sulfuric acid, hydrochloric acid and perchloric acid the modification which comprises spraying on the material during acetylation a mixture consisting of part of the acetic anhydride necessary for acetylation and the catalyst, and regulating the rate of spraying in such manner that it is low at the beginning of the reaction, but increases during the course of the reaction, care being taken that the temperature of the reaction mixture does not rise substantially above 50° C.

4. In the process of acetylating cellulosic material in batches of more than 1000 kgs. each by means of a mixture containing glacial acetic acid, acetic acid anhydride, methylene chloride and sulfuric acid as a catalyst, the modification which comprises spraying on the material during acetylation a mixture consisting of the catalyst, part of the acetic acid anhydride and methylene chloride necessary for acetylation, and regulating the rate of spraying in such manner that it is low at the beginning of the reaction, but increases during the course of the reaction, care being taken that the temperature does not rise substantially above 50° C.

RUDOLF HOFMANN.
WILHELM SIMSON.